United States Patent [19]
Baude et al.

[11] Patent Number: 5,296,305
[45] Date of Patent: Mar. 22, 1994

[54] METHOD OF FABRICATING A LENS MADE OF TRANSPARENT POLYMER WITH MODULATED REFRACTING INDEX

[75] Inventors: Dominique Baude, Saint-Ouen; Daniel Lougnot, Mulhouse, both of France

[73] Assignee: Esslior International (Compagnie Generale d'Optique), Creteil Cedex, France

[21] Appl. No.: 71,871

[22] Filed: Jun. 4, 1993

Related U.S. Application Data

[63] Continuation of Ser. No. 793,408, Jan. 10, 1992, abandoned.

[30] Foreign Application Priority Data

May 11, 1990 [FR] France .................. 90 05936

[51] Int. Cl.$^5$ ............................................ B32B 27/30
[52] U.S. Cl. ............................. 428/520; 427/164; 427/272; 427/273; 427/274; 427/336; 427/352; 427/353; 427/492; 427/510; 427/518; 427/558; 428/522
[58] Field of Search ............. 428/520, 522; 427/164, 427/272, 273, 274, 336, 352, 353, 492, 510, 518, 558

[56] References Cited

U.S. PATENT DOCUMENTS

| | | | |
|---|---|---|---|
| 3,953,620 | 4/1976 | Chandross et al. | 427/53 |
| 3,955,015 | 5/1976 | Ohtsuka et al. | 427/163 |
| 3,993,485 | 11/1976 | Chandross et al. | 96/27 H |
| 4,152,508 | 5/1979 | Ellis et al. | 526/279 |
| 4,173,475 | 11/1979 | Chandross et al. | 430/290 |
| 4,330,383 | 5/1982 | Ellis et al. | 204/159.13 |
| 4,447,474 | 5/1984 | Neefe | 427/164 |
| 4,447,557 | 10/1984 | Rauch | 430/308 |
| 4,550,059 | 10/1985 | Dalton et al. | 428/409 |
| 4,715,858 | 12/1987 | Lindstrom | 623/5 |
| 4,752,498 | 6/1988 | Fudim | 427/54.1 |
| 4,777,116 | 10/1988 | Kawatsuki et al. | 430/290 |
| 4,778,256 | 10/1988 | Serizawa | 350/320 |
| 4,824,688 | 4/1989 | Covington | 427/2 |
| 4,838,634 | 6/1989 | Bennion et al. | 350/96.12 |
| 4,948,216 | 8/1990 | Brazas, Jr. et al. | 350/96.11 |
| 4,961,954 | 10/1990 | Goldberg et al. | 427/2 |
| 5,006,187 | 4/1991 | Cook et al. | 156/244.11 |
| 5,028,358 | 7/1991 | Blum | 264/1.4 |

FOREIGN PATENT DOCUMENTS

WO90/13832  11/1990  World Int. Prop. O. .

*Primary Examiner*—Bernard Pianalto
*Attorney, Agent, or Firm*—Millen, White, Zelano & Branigan

[57] ABSTRACT

The present invention relates to a method of manufacture of an optical lens providing refractive index modulation, characterized in that, starting from a previously shaped lens of transparent hydrophilic polymer of the hydrogel type, the lens is impregnated with a photopolymerizable composition containing at least one monomer and a photoinitiator in solution in a solvent which causes swelling of the lens, the impregnated lens is subjected to irradiation which is spatially modulated in irradiation intensity and/or irradiation time, thus causing local selective polymerization of the monomer, whereupon the excess quantity of photoinitiator and non-polymerized monomer is removed by solvent extraction.

20 Claims, 1 Drawing Sheet

METHOD OF FABRICATING A LENS MADE OF TRANSPARENT POLYMER WITH MODULATED REFRACTING INDEX

This application is a continuation of application Ser. No. 07/793,408, filed Jan. 10, 1992, abandoned.

The present invention relates to the techniques which make it possible to modify the optical properties of a transparent polymer, more particularly when it is sought to modulate the refractive index of a semifinished article of transparent organic material which has previously been polymerized and shaped, without substantially modifying its geometry or its state of surface.

Under these conditions, a preferred application of the invention relates to the manufacture of artificial optical lenses for correcting eyesight such as contact lenses and ocular implants in view of the fact that, in these examples, it is of great importance to preserve a predetermined geometrical shape as well as qualities of surface which ensure, on both faces of the lens, biological compatibility with the ocular medium and absence of irritation of the eye.

The distinctive feature of lenses of this type lies on the one hand in the fact that they have small dimensions and are intended to be employed in full aperture in contradistinction to spectacle lenses, and on the other hand in the fact that they must have a predetermined geometrical shape which will be adapted to the morphology of the wearer's eye in the case of contact lenses, for example, or which will provide basic accommodation power in the case of an implant for the replacement of the crystalline lens of the eye.

In this type of lens, the refractive index modulation contemplated by the invention may be intended in particular to give an aspheric optical power profile to a lens having initially spherical optical power or to produce a diffraction grating which provides bifocality in a contact lens or an implant for far-sighted persons. Refractive index modulation can also help to correct other defects of vision such as astigmatism or to compensate for chromatic aberrations.

European Pat. Appln. No. 0,064,812 (to Pilkington) describes applications of this type and proposes refractive index modulation involving the development of a layer of photosensitive gelatin which is treated with dichromate and in which a latent image is recorded by photoreduction under irradiation with modulated intensity. This results in differential local hardening.

It is also known that there exist other methods for forming diffraction gratings on rigid supports by modulating in thickness and refractive index transparent films applied on said supports, this being achieved by producing local photopolymerization of a monomer which is incorporated with a prepolymer. Methods of this type have been proposed for forming waveguide films or holograms.

Since flat thin films are involved in contrast to the present invention, the known methods entail the need to deposit on a rigid support a liquid composition including the basic polymer in solution with the photopolymerizable monomer as well as a photoinitiator which is capable of causing polymerization of said monomer under the action of radiation. The deposit is then hardened by exposing it to a radiation source which is modulated in intensity, in power or in exposure time, or through a mask of suitable shape, whereupon the non-hardened constituents derived in particular from non-irradiated zones of the film are removed. As a result of the deficient stability in time of the refractive index modulations thus obtained, it has sometimes been recommended in addition to carry out a chemical reaction for fixing the monomer on the polymer in order to prevent excessively easy diffusion from destroying the index modulations. Supports of porous silica glass have also been employed for the same purpose.

When it is sought to apply these techniques to the field of ophthalmic lenses, it is naturally imperative to ensure that the index modulations achieved remain stable in time and are insensitive to the ocular medium. Moreover, another problem which does not exist in the case of films of the prior art arises from the need to conform to a predetermined lens geometry.

In point of fact, the techniques of screen printing by photosensitization which were applied in the prior art can in no event be directly transposed to refractive index modulation of a polymer to be employed as an artificial optical lens in the eye since they did not need to satisfy the same requirements of geometrical stability, of quality and of biocompatibility of their entire surface.

And when some investigators such as the authors of U.S. Pat. No. 4,778,256 have sought to treat objects and not films on a substrate, the variation involved was in depth and not parallel to the surface as is required by the lenses contemplated by the present invention. Furthermore, the objects treated were in this case also of porous silica glass.

Other authors have proposed to construct waveguides by selective polymerization, through a mask, of a monomer introduced in a matrix of polycarbonate containing a photoinitiator. In this case also, however, the matrix was in the form of a flat thin film of rigid polymer and contained the photoinitiator prior to diffusion of the photopolymerizable monomer therein Moreover, not in order to form a diffraction grating but in order to produce a variation in the refractive index of a lens, Japanese patent No. 61,053031 has contemplated the use of a fixed mask of variable transparency in order to irradiate a photopolymerizable organic material disposed in a film having parallel faces.

At this stage of the prior art, it still seemed impossible to carry out a similar treatment on polymers in the form of semifinished articles without any substrate while meeting the requirements of artificial optical lenses for ophthalmic use.

However, in French patent Application No. 89,06323 published under No. 2,646,930 and re-stated in International patent Application WO 90/13832 filed on the same day as the French patent Application, the priority of which is claimed herein, the present Applicant has proposed a method which consists in impregnating a biocompatible polymer with a photo-polymerizable composition and in polymerizing the composition locally by irradiation through a mask. This method makes it possible to form a diffraction element within a lens of cross-linked polymer for a contact lens or ocular implant and is applicable to hydrogels, preference being given to the use of a solvent-free photopolymerizable composition containing at least one monomer which results in a biocompatible polymer and a suitable photoinitiator.

The same technique can also serve to carry out other types of modulations by irradiation through a rotating mask as described in another French patent filed by the present Applicant under No. 90 00 679 and not yet published.

Experience has shown, however, that this method still resulted in a few surface deformations of the lens which are less objectionable than in the prior art techniques, however, insofar as it involves impregnation of the mixture of photopolymerizable monomer and photoinitiator throughout the volume of the lens.

The present invention makes it possible to overcome these disadvantages by means of a method of manufacture of an optical lens providing refractive index modulation, characterized in that, starting from a previously shaped lens of transparent hydrophilic polymer of the hydrogel type, said lens is impregnated with a photopolymerizable composition containing at least one monomer and one photoinitiator in solution in a solvent which causes swelling of the hydrogel, such as an aqueous solvent, the impregnated lens is subjected to irradiation which is spatially modulated in irradiation intensity and/or in irradiation time, thus producing selective local polymerization of the monomer, whereupon the excess quantity of photoinitiator and non-polymerized monomer is removed by solvent extraction.

In consequence, in accordance with this method, the treated lens is never dried-up between the successive steps of the method. Preferably, the lens always remains swollen by an aqueous solvent. Moreover, it has been observed that the hydrogels for lenses to be employed in an ophthalmic medium, such as the hydrogels based on methyl methacrylate (MMA) and vinylpyrrolidone (NVP) or on hydroxyethyl methacrylate and vinylpyrrolidone (HEMA/NVP) or else hydrogels of polyhydroxyethyl methacrylate exhibit a specific macromolecular lattice which is highly conducive to good distribution and stability of an interpenetrated polymer network formed therein by the method of refractive index modulation in accordance with the invention.

In an advantageous form of practical application of the method, the first step consists in immersing the hydrogel which is preferably in the previously hydrated state in an aqueous solution of the photopolymerizable composition so as to cause the polymer to swell by means of this solution, by displacing the pure water which it contains. However, it is also possible to start from a dry hydrogel which is then saturated directly with the treatment solution. As a general rule, the hydrophilic polymers employed for constituting the basic hydrogel have water absorption capacities of 30% to 80% by volume.

The monomer which is present in the impregnation composition can be of the same type as those employed in the manufacture of the basic lens material or of a different type, it being understood that the monomer must be soluble in the swelling solvent and more especially water, or at least soluble in the ternary water/monomer/photoinitiator system. In both cases, it is an advantage to choose a monomer which, after hardening of the composition in which it is combined with the photoinitiator, results in a material whose refractive index is substantially different from that of the basic lens material, the lens being considered under its normal conditions of use and therefore in a state in which it is hydrated to saturation by water.

In accordance with the invention, it is an advantage to make use of a double ethylene bond monomer selected from the alkyl acrylates and alkyl methacrylates as well as their derivatives, in particular methyl methacrylate; the aromatic vinyl monomers and their derivatives such as styrene, for example; the N-vinyl-lactams and their derivatives, preferably N-vinyl-pyrrolidone; the hydroxyalkyl methacrylates such as hydroxyethyl methacrylate (HEMA) or hydroxypropyl methacrylate (HPMA). It will be preferable, however, to choose methyl methacrylate, hydroxyethyl methacrylate or propyl methacrylate. A monomer of this type is preferably completed by a cross-linking agent such as a difunctional acrylate or more especially an alkyl dimethacrylate in which the alkyl chain can have in particular 1 to 5 carbon atoms. The quantity of cross-linking agent to be employed can be determined in a conventional manner according to the nature and concentration of the selected monomer or monomers to be cross-linked.

The monomers mentioned above have very variable degrees of solubility in water and sometimes a low degree of solubility as in the case of methyl methacrylate. But the nature of lenses of the hydrogel type is such that they are capable of concentrating the monomer therein during impregnation, with the result that it will be possible to attain the requisite concentrations by employing a sufficient quantity of photopolymerizable composition which is reconstituted periodically. Alternatively, it is possible to introduce on the sparingly or very sparingly soluble monomers groups which will make them water-soluble without thereby affecting their other properties. For example, styrene sulfonic acid can advantageously be employed instead of styrene.

It is worthy of note here that the lens is not deformed by the treatment of the invention in spite of what might have been expected from hydrophobic molecules of methyl polymethacrylate imprisoned in a hydrophilic matrix or from zones of polyHEMA which are rather hydrophilic but have a swelling ratio of only 40%, in a MMA/NVP matrix having a swelling ratio of the order of 70%.

Examples of aqueous compositions which can be employed for the purpose of swelling the lenses in accordance with the invention advantageously include a monomer consisting of 2-hydroxyethyl-methacrylate (HEMA) or 2-hydroxypropyl-methacrylate (HEMA) at a concentration within the range of 0.5 to 0.9M in water, in association with a cross-linking agent at a concentration within the range of $0.5 \times 10^{-2}$M to $5 \times 10^{-2}$M, selected in particular from the following compounds: ethyleneglycol dimethacrylate (EGDM) or triethyleneglycol dimethacrylate (TEGDM) at a concentration which is preferably of the order of $10^{-2}$, allyl methacrylate, N-N' methylene diacrylamide in a proportion of the order of $10^{-2}$M to 2.5 or $3 \times 10^{-2}$M respectively.

In regard to the photoinitiator which is present with the modulation monomer in the impregnation composition or photosensitization composition, it can consist of any compound for producing free radicals under the action of irradiation, whether alone or by cooperation with another proton donor compound. It may thus be stated that the photoinitiators employed, or photopolymerization initiators, can be either of the photocleavable type or of the photoactivatable type with a preference, however, for those which are active for initiating photopolymerization of the monomer at irradiation wavelengths within the visible region or near-ultraviolet region.

A photocleavable photoinitiator includes one or a number of compounds which operate by directly generating one or a number of polymerization-initiating free radicals whilst a photoactivatable photoinitiator is formed by a system for producing such radicals by a photoassisted oxidation-reduction reaction between a light-absorbing compound and a hydrogen or electron donor, both of which are present in the system. As will be readily understood, it is also possible to employ mixtures of both types of photoinitiators.

Examples of photocleavable compounds which are known per se are selected from the alcoxyacetophenone derivatives, benzoin ethers, phosphine oxides, benzoyloxime derivatives. Examples of known photoactivatable photoinitiators include an absorber for producing free radicals and selected from the benzophenones, benzyls, xanthones, anthrones, thioxanthones, fluorenones, suberones, acridones, in association with a proton donor compound of the type comprising the ethers, alcohols, amines, aminoacids or organometallic compounds. It will be possible in particular to employ the photoinitiators constituted by thioxanthones which carry an ionic radical such as those of the family described in U.S. Pat. No. 4,791,213 in which the absorption peak is located within the range of 390 to 405 nanometers.

In practice, the photoinitiators employed in the practical application of the method in accordance with the invention will be selected from the thioxanthones and the benzophenones which carry an alkylamine or oxyalkylamine radical in the form of amine salt.

In an advantageous form of practical application of the method, the first step consists in immersing the previously hydrated hydrogel in an aqueous solution of the photopolymerizing composition so as to cause swelling of the polymer by means of this solution, by displacing the pure water which it contains. Active photoinitiators which are present in a low concentration are preferred for this purpose since they make it possible to avoid a variation of the modulated refractive index through the thickness of the lens, hence the preference given in accordance with the invention to photoactivatable mixtures in which the photoinitiator proper is associated with a proton donor compound.

This accordingly prevents the undesirable appearance of a refractive index gradient as a function of the irradiation depth. In accordance with the invention, this gradient remains within the limits of an acceptable variation of 10 to 20%. The concentration of photoinitiator in the impregnation solution is advantageously within the range of $10^{-5}$M to 0.5M and especially of the order of $10^{-2}$ to $10^{-4}$M, particularly in the case of water-soluble thioxanthones. In combination, it is an advantage to employ as an electron donor an ethanolamine such as methyldiethanolamine (MDEA) or triethanolamine (TEA) at a concentration of the order of $10^{-2}$M or preferably within the range of $1 \times 10^{-2}$ to $5 \times 10^{-2}$M.

The irradiation of the following step can be performed by any light source which emits within the range of sensitivity of the photoinitiator employed. The light source can consist in particular of a mercury arc lamp in the case of preferred photosensitization compositions. In order to limit the irradiation to desired zones, a mask can be interposed between the source and the impregnated material. Alternatively, it is possible to resort to a laser beam or to interferences of beams of coherent light or else to make use of a rotating mask having a suitable profile of opaque zones.

In order to carry out subsequent removal of the non-hardened monomer and the unused photoinitiator remaining in particular in the zones which have not been subjected to irradiation, it is only necessary to re-immerse the treated lenses in the swelling solvent (usually pure water) in order to extract the soluble constituents therefrom.

By exposure of the polymer swollen by the aqueous solution of monomer and photoinitiator through a mask having suitable concentric lines followed by development with water, the invention makes it possible in particular to produce in a contact lens preformed to its final shape, a diffraction grating which is suitable for correcting presbyopia without causing any troublesome physical alteration of the lens, even at the surface. This can be achieved without disturbing the normal operation of additives such as anti-UV agents or colorants. The invention makes it possible to control the index modulation within the thickness in a homogeneous manner. It is thus possible to form a diffraction element by adjusting the energy diffracted in the desired power.

The treatment required for this purpose involves a small number of steps and is simple to perform, with the result that the different refractive index lines are formed within the matrix without resulting in surface deformation lines, any overthicknesses being only of the order of 1 to 2 microns. The lines are well delimited and remain so in the course of time. Their fineness is usually of the order of 500 $\mu$m to 10 $\mu$m.

As a general rule, the contact lenses to be treated have a thickness within the range of 100 to 500 microns but this thickness varies from the axis to the periphery. The radius of curvature of the swollen lens in the form in which it is used is usually of the order of 6 to 10 on the front face and of the order of 7 to 9 on the rear face.

In the case of a total diameter of the lens of approximately 10 mm, the diffraction grating obtained in accordance with the invention occupies the central zone over a diameter of the order of 4 to 6 mm with a depth extending over the entire thickness of the lens, therefore of the order of 200 $\mu$m at the center and of the order of 300 to 400 $\mu$m at the edge of the zone. The concentric lines are spaced at 0.5 to 1 mm at the center and are located progressively closer together as the distance from the center increases in the radial direction so as to attain a spacing of 50 to 100 $\mu$m at the edge of the zone.

The rotating mask technique as described in French patent Application No. 90 00679 can also be employed for the purpose of forming the above-mentioned diffraction elements within lenses of hydrogel. Similarly, it is possible to make use of a fixed mask or any other method of spatial modulation of the irradiation source in intensity and/or irradiation time in order to form an aspheric element such as those described in French patent Application No. 90 00679 with the desired power and power gradient.

However, it has been found that the technique of irradiation through a rotating mask offers specific advantages when employed in the method in accordance with the invention for treating an ophthalmic lens of transparent hydrogel which has been shaped so as to be already endowed with a predetermined power profile and caused to swell by a solution of photopolymerizable composition. This is confirmed in particular in the applications of the invention which consist in endowing the lens with a power profile which is different from the original profile, by a spatial modulation of the refractive index which can be combined with a thickness modulation which remains sufficiently small to guard against any appreciable modification of the original general geometry of the lens. In contrast to the diffraction elements, this accordingly involves a continuous modulation in which the modification of the refractive index varies progressively in a direction parallel to the external surface of the lens.

As can be achieved more readily than a static mask which should have transparency-gradation zones, the rotating mask permits radial adjustment of the variation in energy flux which reaches the surface of the lens when it is provided for this purpose for example with alternately opaque and transparent sectors, the angular width of which varies between the center and the periphery of the lens. The refractive index modulation resulting from photopolymerization accordingly adds a modulation of optical power to the original power profile. This is particularly useful for example in order to obtain complementary aspherization from a lens which may be endowed at the outset with spherical power, complementary aspherization being required in the case of lenses for correction of presbyopia.

By means of the rotating mask, it is also possible to obtain a power profile for correcting astigmatism by modulating the speed of angular rotation of the mask according to the instantaneous angular position of the opaque zones. The variations in speed to be imposed on the mask are accordingly calculated as a function of the characteristics of the astigmatic power profile to be obtained. It is clearly possible in addition to combine predetermined forms of opaque and transparent zones for aspherization with a modulation of the speed of rotation of the mask.

In the practical application of the invention, aspherization of a lens can be obtained both by means of alternately opaque and transparent sectors as mentioned above (on condition that these sectors are not delimited by a rectilinear radius but by curved lines) and by means of a variation of the radial width of the zones which extend around the entire mask along a predetermined curve as a function of the phase law to be obtained, expressed by the wavelength corresponding to maximum phototopic sensitivity of the eye. In general terms, it is thus necessary to vary the photopolymerization energy flux received during rotation of the mask in order to achieve optical powers having a difference of 0.5 to 3.5 diopters over a radial distance of the order of 2 mm. This can be obtained in accordance with the invention by a variation in exposure time in a ratio of 10 to 70 secs.

In the case of a lens having zero original power, the transparent zone of the mask will start from a reference radius and extends therefrom over the entire radial distance, then returns to said reference radius and is thinned-down to a point at the periphery. If the lens has spherical power which is not zero at the outset, this transparent zone will come to an end on the reference radius at an intermediate point so as to form another opaque zone at the periphery. Although this has the disadvantage of leading to more complex shapes of masks, consideration can be given to a reduction of the modulo $2\pi$ phase law entailing the need to form two transparent zones, the shapes of which around the entire mask correspond to each other by homothetic transformation.

When it is desired to carry out simultaneous correction of astigmatism, it is easy to obtain a spherotoric power lens having different power profiles along two axes which do not coincide and are usually orthogonal. This is achieved by applying a modulation of the angular speed of rotation characterized by its value as the reference radius passes along each of these axes.

For further information, the calculations which are useful in order to determine the shape of the mask and the conditions of driving in rotation are within the capacity of those who are versed in the art and who may accordingly refer, for example, to French patent Application No. 90 00679.

The invention will now be described in greater detail within the scope of particular examples of practical application which are not given in any limiting sense.

EXAMPLE 1

The photopolymerizable impregnation base is constituted by a mixture of hydroxyethyl methacrylate (HEMA) and of a difunctional acrylate cross-linking agent: ethyleneglycol dimethacrylate (EGDM) in solution in distilled water.

The basic polymer is a copolymer of methyl methacrylate and N-vinylpyrrolidone (MMA-NVP) of the type marketed by Essilor under the trade name Lunelle. Semifinished samples are thus available in the form of optical lenses 13 to 14 mm in diameter.

The photoinitiator system consists of a water-soluble thioxanthone marketed by International Biosynthetics under the name Quantacure (QTX) which absorbs at 405 nm in water and has the formula:

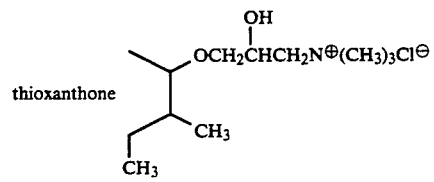

and of a tertiary amine, methyl diethanolamine (MDEA).

The aqueous impregnation composition is formed by a mixture of the polymerizable base and of the photoinitiator system. The ranges of concentration employed are within the following limits:
Concentration in QTX: $10^{-5}$M to 0.5M
Concentration in MDEA higher than $1.7 \times 10^{-2}$M
Concentration in HEMA within the range of 0.6M to 1M
Concentration in EGDM of the order of $10^{-2}$M The irradiation system is constituted by a high-pressure mercury-arc lamp having a power of 100 W, collimated by a lens having a focal distance of 200 mm. The flux density measured in respect of the emission lines at 405–408 nm has a value of 0.75 mW/cm$^2$ at the level of the polymer sample.

The visible lines of mercury are selected at the level of the lamp.

Swelling of the lens is initiated in the composition comprising the photoinitiator and the polymerizing base during a period of at least thirty minutes at room temperature.

In respect of the following concentrations:
QTX = $10^{-4}$M
MDEA = $1.8 \times 10^{-2}$M
HEMA = 0.7M
EGDM = $10^{-2}$M a refractive index variation of $5 \times 10^{-3}$ is obtained after three minutes of exposure in the case of a lens having a thickness of 200 μm and a resolution of at least 20 μm.

This refractive index variation makes it possible among other things to produce bifocal kinoform diffraction lenses by index variation through a suitable rotating mask.

In respect of the following concentrations:
QTX = $5 \times 10^{-4}$M
MDEA = $1.8 \times 10^{-2}$M
HEMA = 0.7M
EDGM = $10^{-2}$M an index variation of $8 \times 10^{-3}$M is obtained after three minutes of exposure in the case of a lens having a thickness of 200 μm.

This index variation makes it possible to form aspheric lenses such as those described in the Essilor patent No. 90 00679 with a power of 1.5 and 2 additional diopters.

In respect of the following concentrations:
QTX = $10^{-3}$M
MDEA = $1.8 \times 10^{-2}$M
HEMA = 0.7M
EGDM = $10^{-2}$M an index variation of $10^{-2}$ is obtained after three minutes of exposure in the case of a lens having a thickness of 200 μm.

This variation of refractive index makes it possible to produce aspheric lenses in respect of an addition of 2.5 diopters.

EXAMPLE 2

QTX is replaced by another thioxanthone which has the formula:

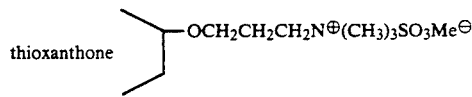

At concentrations which are identical with those mentioned in Example 1, the results are comparable.

When subjected to aging tests in physiological serum at 60° C. over a period of one month, the lenses have retained unchanged diffraction efficiency.

EXAMPLE 3

Thioxanthone is replaced by a water-soluble benzophenone designated as Quantacure BTC and developed by International Biosynthetics, having the following formula:

benzophenone para- $CH_2N^{\oplus}$ $(CH_3)$ $Cl^{\ominus}$

Irradiation is performed in UV radiation at 365 nm, corresponding to the range of sensitivity of thioxanthone.

Photopolymerization is carried out by using for the purpose of impregnating the basic polymer a mixture having the following concentrations:
QTX BTC = $10^{-3}$M
MDEA = $1.8 \times 10^{-2}$M
HEMA = 0.7M
EGDM = $10^{-2}$M

EXAMPLE 4

Instead of methyl diethanolamine, triethanolamine (TEA) is employed as photosensitive activator for decomposition of the photoinitiator.

The sensitization mixture has the following composition expressed as a concentration of the constituents in water:
QTX = $10^{-3}$M
TEA = $10^{-2}$M
HEMA = 0.7M
EGDM = $10^{-2}$M There is obtained a photopolymerization which makes it possible to produce a diffraction lens.

EXAMPLE 5

Methyl diethanolamine is employed and QTX is replaced by another thioxanthone developed by International Biosynthetics under the trade name Quantacure ABC which has the formula:

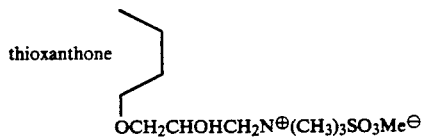

For an exposure time of three minutes, a refractive index modulation of $7.5 \times 10^{-3}$ is obtained in respect of the following concentrations:
Quantacure ABC = 10M
MDEA = $1.8 \times 10^{-2}$M
HEMA = 0.7M
EGDM = $10^{-2}$M

EXAMPLE 6

This example relates to a formulation which is optimized for the production of lenses having a variable power profile.

The photopolymerizable composition is an aqueous solution containing:

| thioxanthone | HTX | $5 \times 10^{-3}$ M |
| | MDEA | $1.2 \times 10^{-2}$ M |
| | EGDM | $10^{-2}$ M |
| | HEMA | 0.7 M |

Thioxanthone HTX corresponds to the formula:

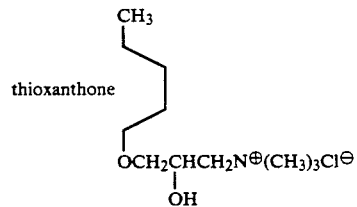

A contact lens of the type considered in the foregoing, designated by the trade name Lunelle, and spherical in the hydrated state, is immersed in the aqueous solution given above during a period of time which varies from 15 to 45 mins and is preferably of the order of 30 mins.

The lens is then withdrawn from the aqueous solution and placed on a support.

BRIEF DESCRIPTION OF THE DRAWING

The sole FIGURE discloses a rotating mask.

The lens is then irradiated through a rotating mask of the type shown in FIG. 1 and consisting of a transparent circular disk 2 having two symmetrical opaque zones 1 which form a bulge from the center and are thinned-down towards the periphery.

Figure 1:
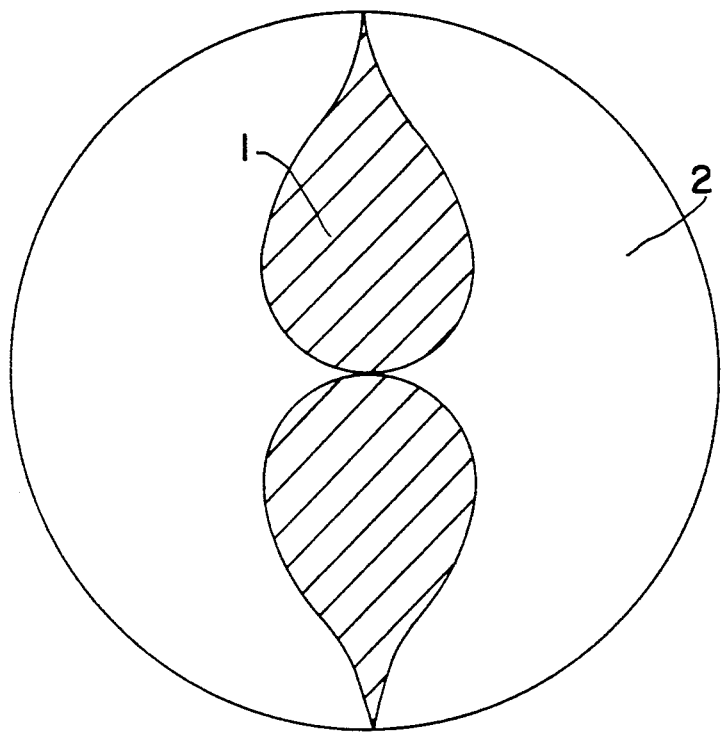

The irradiation flux is 1.5 mW/cm² at a wavelength of 410 nm.

A mask of this type makes it possible to obtain an aspheric contact lens for correction of presbyopia. The lens obtained does not exhibit a power jump as would be the case with a bifocal lens but has a continuum.

In general terms, the shape of the mask is determined by the specific power profile which it is desired to create. Power profiles optimized for correction of presbyopia are described in French patent Application No. 89 01417 in the name of the present Applicant and published on Aug. 10, 1990.

The following table illustrates the addition obtained, that is to say the difference in powers between near vision (NV) and distant vision (DV), the addition being given as a function of the irradiation time.

The addition is measured by means of a phase-difference fronto-interferometer.

| Exposure time (seconds) | 20 | 25 | 30 | 40 |
|---|---|---|---|---|
| Addition (in diopters) | 1.5 | 2 | 2.5 | 3 |

It is possible to obtain the entire usual addition range without exceeding an exposure time of 60 to 70 secs.

It will naturally be understood that the invention is not limited in any sense by the features specified in the foregoing examples or by the details of the particular modes of execution which have been chosen in order to illustrate the invention. All kinds of alternatives may be considered in regard to the operating conditions as well as the nature and proportions of the constituents and reagents without thereby departing from the scope of the invention.

We claim:

1. Method of manufacture of an optical lens or ocular implant providing refractive index modulation, comprising starting from a previously shaped lens of transparent hydrophilic polymer of the hydrogel type, said lens is impregnated with a photopolymerizable composition containing at least one monomer and one photoinitiator in solution in a solvent which causes swelling of the lens, the impregnated lens is subjected to irradiation which is spatially modulated in irradiation intensity and/or in irradiation time, thus producing selective local polymerization of the monomer, whereupon the excess quantity of photoinitiator and non-polymerized monomer is removed by solvent extraction.

2. A Method according to claim 1, wherein said solvent is water.

3. A Method according to claim 1, characterized in that impregnation of the lens is carried out substantially to saturation by an aqueous solution of said monomer and of said photoinitiator which contains in addition a compound for cross-linking said monomer.

4. A Method according to claim 1, wherein the basic polymer of the lens is selected from the hydrogels of methyl methacrylate (MMA) and vinylpyrrolidone (NVP) or of cross-linked polyhydroxyethyl methacrylate or else of hydroxyethyl methacrylate and of vinylpyrrolidone (HEMA/NVP).

5. A Method according to claim 1, wherein the photopolymerizable composition is an aqueous solution containing a monomer such as methyl methacrylate or hydroxymethyl or hydroxypropyl methacrylate at a concentration of the order of 0.5 to 0.9M.

6. A Method according to claim 1, wherein a cross-linking agent for said monomer, is included in said solution and consists essentially of a polyfunctional methacrylate such as ethyleneglycol dimethacrylate or triethylene glycol methacrylate or of allyl methacrylate or N-N' methylene diacrylamide at a concentration within the range of $0.5 \times 10^{-2}$M to $5 \times 10^{-2}$M.

7. A Method according to claim 1, wherein the photoinitiator contains a water-soluble photosensitive compound of the thioxanthone family.

8. A Method according to claim 1, wherein the concentration of photoinitiator in the impregnation solution is within the range of $10^{-5}$M to 0.5M.

9. A Method according to claim 1, wherein the concentration of photoinitiator in the impregnation solution is of the order of $10^{-2}$M to $10^{-4}$M.

10. A Method according to claim 1, wherein the impregnation solution contains an activator for photosensitive decomposition of the polymerization photoinitiator.

11. A Method according to claim 1, wherein said activator is present in the solution at a concentration of the order of 1 to $5 \times 10^{-2}$M.

12. A Method according to claim 1, wherein said irradiation is carried out at a wavelength of the visible region or of the near-ultraviolet region.

13. A Method according to claim 1, wherein said irradiation is carried out through a mask having concentric lines suited for the creation of a diffraction grating within the lens.

14. A method according to claim 1, wherein said irradiation is carried out through a mask which is driven in rotation about its own axis.

15. A method according to claim 14, wherein said mask has zones in the form of alternately opaque and transparent sectors which are capable of adding a power profile modulated spatially in a continuous manner to the original power profile of an ophthalmic lens, especially in order to obtain by refractive index modulation an aspherization power is suitable for to correction of presbyopia.

16. A method according to claim 15, wherein during irradiation, said mask is driven in rotation at an angular velocity which varies as a function of its instantaneous angular position, to achieve by means of refractive index modulation a lens power modulation which provides the lens with an astigmatism-correcting power profile.

17. A contact lens or ocular implant obtained by the method of claim 16.

18. A Method according to claim 14, wherein, during irradiation, said mask is driven in rotation at an angular velocity which varies as a function of its instantaneous angular position, especially in order to achieve by means of refractive index modulation a lens power modulation which endows the lens with an astigmatism-correcting power profile.

19. A contact lens or ocular implant obtained by the method of claim 18.

20. A contact lens or ocular implant obtained by the method of claim 1.

* * * * *